United States Patent
Bhandari et al.

(10) Patent No.: US 12,024,674 B2
(45) Date of Patent: Jul. 2, 2024

(54) METHODS AND COMPOSITIONS FOR SQUEEZE LIFE ENHANCEMENT

(71) Applicant: ChampionX USA Inc., Sugar Land, TX (US)

(72) Inventors: Manojkumar Ramnikalal Bhandari, Sugar Land, TX (US); Renaldo Christmas, Richmond, TX (US); Ian Littlehales, Missouri City, TX (US)

(73) Assignee: ChampionX LLC, Sugar Land, TX (US)

( * ) Notice: Subject to any disclaimer, the term of this patent is extended or adjusted under 35 U.S.C. 154(b) by 38 days.

(21) Appl. No.: 17/569,227

(22) Filed: Jan. 5, 2022

(65) Prior Publication Data
US 2022/0228051 A1 Jul. 21, 2022

Related U.S. Application Data

(60) Provisional application No. 63/139,441, filed on Jan. 20, 2021.

(51) Int. Cl.
   *C09K 8/528* (2006.01)
   *C09K 8/536* (2006.01)
(52) U.S. Cl.
   CPC .............. *C09K 8/528* (2013.01); *C09K 8/536* (2013.01); *C09K 2208/10* (2013.01)
(58) Field of Classification Search
   CPC ..... C09K 8/528; C09K 8/536; C09K 2208/10
   See application file for complete search history.

(56) References Cited

U.S. PATENT DOCUMENTS

| | | |
|---|---|---|
| 6,401,816 B1 | 6/2002 | Price et al. |
| 7,491,682 B2 | 2/2009 | Gupta et al. |
| 7,493,955 B2 | 2/2009 | Gupta et al. |
| 7,686,081 B1 | 3/2010 | Becker |
| 8,664,168 B2 | 3/2014 | Steiner |
| 8,727,002 B2 | 5/2014 | Reyes |
| 8,822,386 B2 | 9/2014 | Quintero et al. |
| 8,871,691 B2 | 10/2014 | Rey et al. |
| 9,221,700 B2 | 12/2015 | Greene et al. |

(Continued)

FOREIGN PATENT DOCUMENTS

| | | |
|---|---|---|
| CA | 2870367 A1 | 10/2013 |
| CA | 3135350 A1 | 10/2020 |

(Continued)

OTHER PUBLICATIONS

International Search Report and Written Opinion for International Patent Application No. PCT/US2022/011334, dated Apr. 8, 2022 (10 pages).

*Primary Examiner* — Alicia Bland
(74) *Attorney, Agent, or Firm* — Eric D. Babych; Barnes & Thornburg LLP

(57) ABSTRACT

The present disclosure provides methods for inhibiting scale formation in subterranean reservoirs. The methods may include depositing silica-based nanoparticles on a surface of the subterranean reservoir and transporting a scale inhibitor to the surface of the subterranean reservoir. The scale inhibitor may adhere to the silica-based nanoparticles through a chemical interaction. The silica-based nanoparticles may adhere to one or more surfaces within the subterranean reservoir.

19 Claims, 2 Drawing Sheets

(56) References Cited

U.S. PATENT DOCUMENTS

| | | |
|---|---|---|
| 9,481,823 B2 | 11/2016 | Brooks et al. |
| 9,587,166 B2 | 3/2017 | Fleming et al. |
| 9,803,450 B2 | 10/2017 | Hardy et al. |
| 9,890,623 B2 | 2/2018 | Ghorbani et al. |
| 9,926,485 B2 | 3/2018 | Yan et al. |
| 10,072,203 B2 | 9/2018 | Chen et al. |
| 10,253,244 B2 | 4/2019 | Holtsclaw et al. |
| 10,266,750 B2 | 4/2019 | Oghena et al. |
| 10,344,202 B2 | 7/2019 | Cox et al. |
| 10,865,339 B2 | 12/2020 | Dreyer et al. |
| 2006/0124301 A1 | 6/2006 | Gupta et al. |
| 2008/0132431 A1 | 6/2008 | De Campo et al. |
| 2009/0163389 A1 | 6/2009 | De Campo et al. |
| 2009/0312201 A1 | 12/2009 | Huang et al. |
| 2012/0208728 A1* | 8/2012 | Fleming ................. C09K 8/528 |
| | | 423/325 |
| 2015/0129225 A1 | 5/2015 | Ghorbani et al. |
| 2015/0203790 A1 | 7/2015 | Strerath et al. |
| 2017/0174978 A1 | 6/2017 | Giro et al. |
| 2019/0292439 A1 | 9/2019 | Cox et al. |
| 2020/0131887 A1 | 4/2020 | Collins |
| 2022/0145162 A1* | 5/2022 | Tomson ................. E21B 43/16 |

FOREIGN PATENT DOCUMENTS

| | | | |
|---|---|---|---|
| CN | 102786159 B | 3/2016 | |
| CN | 108059257 A | 5/2018 | |
| CN | 109592746 A | 4/2019 | |
| CN | 111302506 A | 6/2020 | |
| KR | 100992095 B1 | 11/2010 | |
| KR | 101791063 B1 | 10/2017 | |
| MX | 2010014519 A | 2/2011 | |
| WO | 2004011772 A1 | 2/2004 | |
| WO | 2009144566 A1 | 12/2009 | |
| WO | WO-2020205747 A1 * | 10/2020 | ............... C09K 8/03 |

\* cited by examiner

METHODS AND COMPOSITIONS FOR SQUEEZE LIFE ENHANCEMENT

TECHNICAL FIELD

The present disclosure generally relates to methods and compositions for inhibiting scale formation. More particularly, the disclosure relates to methods and compositions for extending the lifetime of a scale inhibitor treatment in a subterranean reservoir.

BACKGROUND

Scale formation decreases the permeability of a subterranean reservoir, reduces well productivity, and shortens the lifetime of production equipment. Common scales include Calcite, Barite, Celestite, Anhydrite, Gypsum, Halite, iron sulfide and various "exotic" scales, such as calcium fluorite, zinc sulfide, and lead sulfide. In order to clean scales from wells and/or equipment, it may be necessary to halt production, which is both time-consuming and costly. In order to address this problem, operators add scale inhibitors. However, it may prove difficult to release the inhibitors into the reservoir over a sustained period of time. This problem is exacerbated in high temperature environments where dissolution of applied scale inhibitors may be accelerated. As a result, treatments must repeatedly, or even continuously, be undertaken to ensure that the requisite level of scale inhibitor is continuously present in the well.

Scale inhibitor squeeze treatments are methods used in the oilfield to prevent mineral scale formation. A scale inhibitor squeeze treatment typically includes three steps. The first step, commonly referred to as the "preflush," prepares the wellbore and reservoir for the treatment. The second step, which may be referred to as the "scale inhibitor pill" or "main pill," adds the scale inhibitor to the reservoir. The third step, commonly referred to as the "overflush," distributes the scale inhibitor over a larger volume of the reservoir.

A squeeze treatment lifetime is the period of time after which a squeeze treatment must be repeated and relates to how quickly the scale inhibitors are removed from the reservoir during production. Squeeze lifetimes are dependent on a number of factors, such as reservoir temperature, brine composition, reservoir mineralogy, and scale inhibitor chemistry. In an attempt to reduce the number of squeeze treatments in a given well, and thereby simplify the logistics and improve the economics of the treatment, modifications to the treatment procedures have been developed that are targeted at extending squeeze lifetimes. For example, in situ adjustments to the reservoir brine pH, supplementation with calcium or zinc ions, and injection of microcrystalline kaolin have been used with varying degrees of success.

These methods, while offering a degree of squeeze life enhancement, are not without their drawbacks. Methods involving pH adjustment or calcium ion supplementation create the opportunity for damage caused by excessive precipitation of solids. The injection of microcrystalline kaolin can be troublesome in that solids are intentionally introduced into the reservoir and could lead to plugging of pore throats.

BRIEF SUMMARY

The present disclosure provides methods and compositions for inhibiting scale formation. In some embodiments, a method of inhibiting scale formation in a subterranean reservoir is provided. The method comprises depositing silica-based nanoparticles on a surface of the subterranean reservoir, transporting a scale inhibitor to the surface of the subterranean reservoir, adhering the scale inhibitor to the silica-based nanoparticles through a chemical interaction, and inhibiting scale formation in the subterranean reservoir.

The chemical interaction may comprise forming a bond between the scale inhibitor and the silica-based nanoparticles. The bond may be selected from the group consisting an ionic bond, a covalent bond, a metallic bond, a hydrogen bond, a dipole-dipole interaction, a van der Waals bond, and any combination thereof.

In some embodiments, the method further comprises adhering the silica-based nanoparticles to the surface of the subterranean reservoir through a second chemical interaction. The second chemical interaction may comprise forming a bond between the surface of the subterranean reservoir and the silica-based nanoparticles. The bond may be selected from the group consisting an ionic bond, a covalent bond, a metallic bond, a hydrogen bond, a dipole-dipole interaction, a van der Waals bond, and any combination thereof.

In some embodiments, the subterranean reservoir comprises a hydrocarbon.

In certain embodiments, the silica-based nanoparticles comprise a particle size from about 0.1 nm to about 1,000 nm.

In some embodiments, the silica-based nanoparticles are deposited on the surface of the subterranean reservoir in a first step and the scale inhibitor is transported to the surface of the subterranean reservoir in a second step. The second step may further comprise depositing additional silica-based nanoparticles on the surface of the subterranean reservoir.

In some embodiments, a carrier fluid comprises the silica-based nanoparticles. The carrier fluid may comprises a brine. The carrier fluid may comprise from about 0.1 wt. % to about 70 wt. % of the silica-based nanoparticles. In certain embodiments, the carrier fluid comprises greater than 10 wt. % to about 70 wt. % of the silica-based nanoparticles.

In some embodiments, a second carrier fluid comprises the scale inhibitor. The second carrier fluid may comprise a second brine. The second carrier fluid may comprise from about 0.1 wt. % to about 70 wt. % of the scale inhibitor. In certain embodiments, the second carrier fluid comprises greater than 20 wt. % to about 70 wt. % of the scale inhibitor. The scale inhibitor may comprise a member selected from the group consisting of a phosphonate, a sulfonate, a phosphate ester, a polymeric scale inhibitor, and any combination thereof.

In some embodiments, the method excludes a step of adding an organosilane to the subterranean reservoir and/or excludes a step of adding a carbon-based nanomaterial and/or a clay mineral to the subterranean reservoir. In some embodiments, the silica-based nanoparticles and the scale inhibitor are added to the subterranean reservoir separately.

The present disclosure also provides a method of inhibiting scale formation in a subterranean reservoir. The method may comprise preflushing the subterranean reservoir with an aqueous solution comprising silica-based nanoparticles, delivering a scale inhibitor to a wellbore of the subterranean reservoir, transporting the scale inhibitor to a surface within the subterranean reservoir, adhering the scale inhibitor to the silica-based nanoparticles through a chemical interaction, and inhibiting scale formation in the subterranean reservoir.

In some embodiments, additional silica-based nanoparticles are added to the subterranean reservoir during the delivering and/or transporting steps.

In some embodiments, the chemical interaction comprises forming a bond between the scale inhibitor and the silica-based nanoparticles. The bond may be selected from the group consisting an ionic bond, a covalent bond, a metallic bond, a hydrogen bond, a dipole-dipole interaction, a van der Waals bond, and any combination thereof.

In some embodiments, the method further comprises adhering the silica-based nanoparticles to the surface of the subterranean reservoir through a second chemical interaction. The second chemical interaction may comprise forming a bond between the surface of the subterranean reservoir and the silica-based nanoparticles. The bond may be selected from the group consisting an ionic bond, a covalent bond, a metallic bond, a hydrogen bond, a dipole-dipole interaction, a van der Waals bond, and any combination thereof.

In some embodiments, the subterranean reservoir comprises a hydrocarbon.

In some embodiments, the silica-based nanoparticles comprise a particle size from about 0.1 nm to about 1,000 nm.

In certain embodiments, the aqueous solution comprises a brine. The aqueous solution may comprise from about 0.1 wt. % to about 70 wt. % of the silica-based nanoparticles. The aqueous solution may comprise greater than 10 wt. % to about 70 wt. % of the silica-based nanoparticles.

In some embodiments, a second aqueous solution comprises from about 0.1 wt. % to about 70 wt. % of the scale inhibitor. The second aqueous solution may comprise a brine. The second aqueous solution may comprise greater than 20 wt. % to about 70 wt. % of the scale inhibitor. In certain embodiments, the scale inhibitor comprises a member selected from the group consisting of a phosphonate, a sulfonate, a phosphate ester, a polymeric scale inhibitor, and any combination thereof.

In some embodiments, the method excludes a step of adding an organosilane to the subterranean reservoir and/or excludes a step of adding a carbon-based nanomaterial and/or a clay mineral to the subterranean reservoir. In some embodiments, the silica-based nanoparticles and the scale inhibitor are added to the subterranean reservoir separately.

In certain embodiments, the silica-based nanoparticles are colloidal silica-based nanoparticles or functionalized silica-based nanoparticles.

The foregoing has outlined rather broadly the features and technical advantages of the present disclosure in order that the detailed description that follows may be better understood. Additional features and advantages of the disclosure will be described hereinafter that form the subject of the claims of this application. It should be appreciated by those skilled in the art that the conception and the specific embodiments disclosed may be readily utilized as a basis for modifying or designing other embodiments for carrying out the same purposes of the present disclosure. It should also be realized by those skilled in the art that such equivalent embodiments do not depart from the spirit and scope of the disclosure as set forth in the appended claims.

BRIEF DESCRIPTION OF THE SEVERAL VIEWS OF THE DRAWINGS

A detailed description of the invention is hereafter described with specific reference being made to the drawings in which.

DETAILED DESCRIPTION

Figure 1:
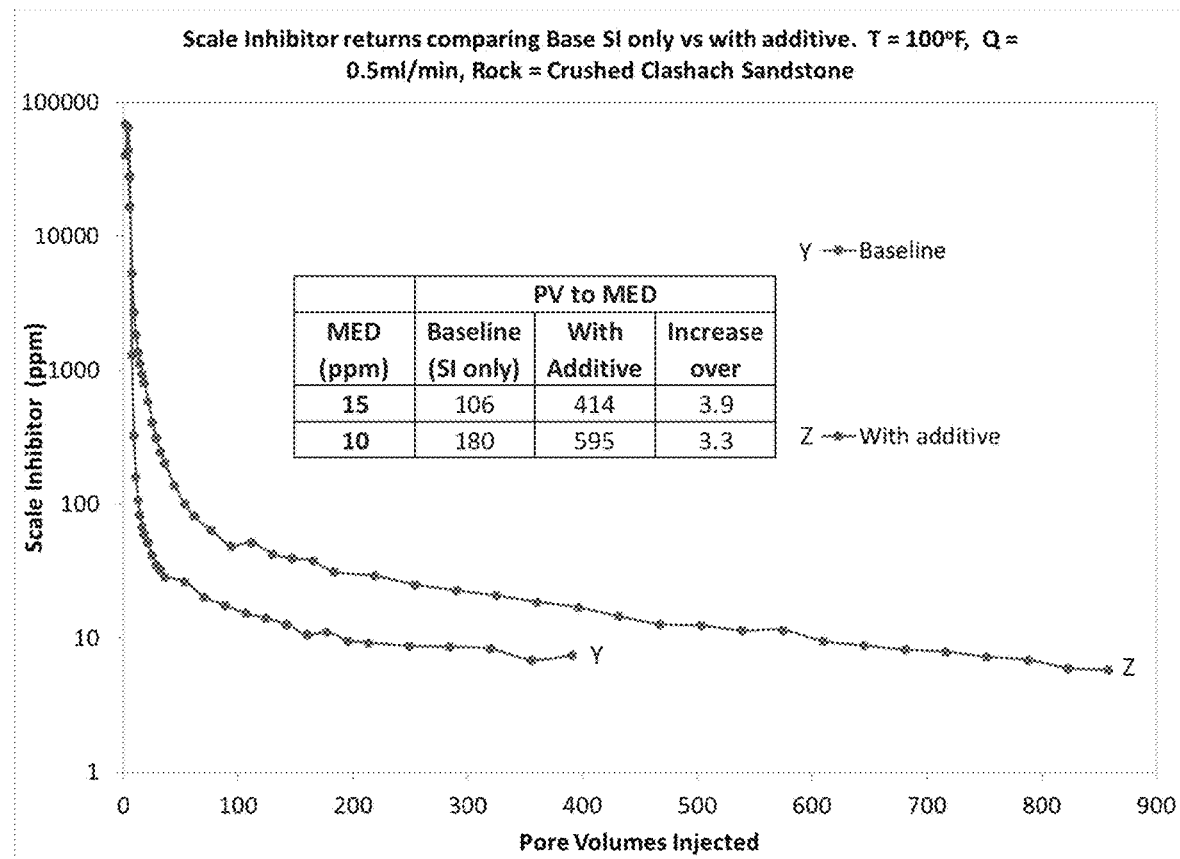
FIGS. 1 and 2 show results from pack-flood experiments carried out with prior art methods and inventive methods disclosed in the present application.

Various embodiments are described below. The relationship and functioning of the various elements of the embodiments may better be understood by reference to the following detailed description. However, embodiments are not limited to those explicitly described below.

Unless otherwise defined, all technical and scientific terms used herein have the same meaning as commonly understood by one of ordinary skill in the art. In case of conflict, the present document will control. Preferred methods and materials are described herein although methods and materials similar or equivalent to those described herein can be used in practice or testing of embodiments of the present disclosure. The materials, methods, and examples disclosed herein are illustrative only and not intended to be limiting.

As used herein, the term "scale inhibitor" refers to a compound or composition that inhibits, prevents, and/or delays the deposition and/or formation of scale within a hydrocarbon producing system. A hydrocarbon producing system may include, for example, a subterranean reservoir and any equipment used during oil or gas production, such as tubes, pipes, pumps, storage containers, etc.

As used herein, the term "particle size" refers to the opening size of a wire mesh sieve, wherein particles able to pass through the openings are assigned the sieve size, or "mesh", as the particle size. Thus, "particle size" as used herein refers not to an average size but to the maximum size of particles in a mixture thereof, as determined by ability to pass through a known size mesh opening. The American Society for Testing and Materials (ASTM) has developed complete procedures for sieving of particles; see e.g., ASTM C136.

The present disclosure provides methods, compounds, and compositions for inhibiting scale formation. The methods, compounds, and compositions are particularly useful for extending the lifetime of a scale inhibitor treatment in a subterranean reservoir. Preventing and/or inhibiting scale formation according to the present disclosure is effective for a variety of insoluble particulates in a system, such as an aqueous system, capable of forming scale. Such particulates include, but are not limited to, inorganic mineral components in the form of sulfates (e.g., barium sulfate, strontium sulfate, calcium sulfate), chlorides (e.g., barium chloride, strontium chloride, calcium chloride), carbonates, iron sulfides, etc.

In some embodiments, the present disclosure relates to methods of inhibiting scale formation in a subterranean reservoir. The methods may comprise depositing silica-based nanoparticles on a surface of the subterranean reservoir. In some embodiments, the subterranean reservoir comprises a hydrocarbon. In certain embodiments, the subterranean reservoir is an oil well or a gas well.

Typically, the silica-based nanoparticles are pumped into the subterranean reservoir. In some embodiments, a carrier fluid comprises, consists of, or consists essentially of the silica-based nanoparticles. In some embodiments, the silica-based nanoparticles are dissolved, dispersed and/or suspended in a carrier fluid.

The carrier fluid for the silica-based nanoparticles may be aqueous or non-aqueous. Suitable non-aqueous carriers include alkanols, such as methanol or polyols (e.g., a glycol). In some embodiments, glycols include those of the formula $(CH_2)_n(OH)_2$ wherein n is 2 to 6 (e.g., ethylene glycol). Other suitable non-aqueous carriers include, but are not limited to, aldehydes, diesel, base oil (mineral oil), kerosene, heavy aromatic naptha and petroleum distillates. Non-aqueous carriers may be used, for example, if the reservoir is water-sensitive.

Alternatively, the carrier fluid may be aqueous (e.g., sea water). The aqueous carrier fluid may comprise, for example, clean, filtered, produced brine, or brine prepared by adding inorganic salts, such as KCl or NH$_4$Cl, to water.

The carrier fluid and silica-based nanoparticles may be combined using batch mixing. For example, a volume of brine may be contained in a tank and the silica-based nanoparticles, along with any additional additives, may be added to the tank and mixed into the brine. In some embodiments, the combination may be prepared by pumping brine from a source and injecting the silica-based nanoparticles, along with any additional additives, into the flowing brine. The silica-based nanoparticles and any additional additives may be mixed into the brine by means of a static mixer or other mechanical device before entering the wellbore.

The amount of silica-based nanoparticles in the carrier fluid may be selected by one of ordinary skill in the art. In some embodiments, the carrier fluid comprises from about 0.1 wt. % to about 70 wt. % of the silica-based nanoparticles. For example, the carrier fluid may comprise from about 0.1 wt. % to about 50 wt. %, from about 0.1 wt. % to about 40 wt. %, from about 0.1 wt. % to about 30 wt. %, from about 0.1 wt. % to about 20 wt. %, or from about 0.1 wt. % to about 10 wt. % of the silica-based nanoparticles. In certain embodiments, the carrier fluid comprises greater than 10 wt. % to about 70 wt. % of the silica-based nanoparticles, such as greater than about 15 wt. % to about 70 wt. %, greater than about 20 wt. % to about 70 wt. % or greater than about 25 wt. % to about 70 wt. % of the silica-based nanoparticles.

In some embodiments, the silica-based nanoparticles chemically interact with one or more surfaces within the subterranean reservoir. In some embodiments, the silica-based nanoparticles adhere to one or more surfaces of the subterranean reservoir. For example, the silica-based nanoparticles may bond to one or more surfaces of the subterranean reservoir. The bond may be selected from, for example, an ionic bond, a covalent bond, a metallic bond, a hydrogen bond, a dipole-dipole interaction, a van der Waals bond, and any combination thereof. In some embodiments, the bond may be to a silicon atom, such as a silicon-oxygen bond, and/or a bond formed between an atom and a hydroxyl group.

Any suitably sized silica-based nanoparticles may be chosen. In some embodiments, the silica-based nanoparticles comprise a particle size ranging from about 0.1 nm to about 1,000 nm. For example, the silica-based nanoparticles may comprise a particle size ranging from about 0.1 nm to about 800 nm, from about 0.1 nm to about 600 nm, from about 0.1 nm to about 500 nm, from about 0.1 nm to about 400 nm, from about 0.1 nm to about 300 nm, from about 0.1 nm to about 200 nm or from about 0.1 nm to about 100 nm.

Any known silica-based nanoparticles may be utilized, such as those disclosed in U.S. Pat. Nos. 6,486,216, 6,361,653, 5,840,158, 6,361,652, 6,372,805, and 8,936,772, the disclosures of which are incorporated by reference into the present application in their entirety.

In some embodiments, the silica-based nanoparticles are colloidal silica-based nanoparticles. In some embodiments, the silica-based nanoparticles or colloidal silica-based nanoparticles are functionalized. Functionalized silica-based nanoparticles or functionalized colloidal silica-based nanoparticles include, for example, nanoparticles comprising silica functionalized with end groups, such as amino, thiol, halide, carboxylic acid, etc.

The methods of inhibiting scale formation provided herein also comprise a step of adding a scale inhibitor to the subterranean reservoir. In some embodiments, the scale inhibitor may be added through a wellbore and pumped throughout the reservoir. The scale inhibitor interacts with the silica-based nanoparticles within the reservoir. In some embodiments, the scale inhibitor adheres to the silica-based nanoparticles through a chemical interaction.

The chemical interaction may comprise forming a bond between the scale inhibitor and the silica-based nanoparticles. The bond may be selected from the group consisting an ionic bond, a covalent bond, a metallic bond, a hydrogen bond, a dipole-dipole interaction, a van der Waals bond, and any combination thereof. In some embodiments, the bond may be to a silicon atom, such as a silicon-oxygen bond, and/or a bond formed between an atom and a hydroxyl group.

Illustrative, non-limiting examples of scale inhibitors that may be used in connection with the present disclosure include phosphonates, sulfonates, phosphates, phosphate esters, polymers, such as polymers comprising phosphonate or phosphonate ester groups, polymeric organic acids, peroxycarboxylic acids, and any combination thereof. In some embodiments, the scale inhibitor may be selected from compounds comprising amines and/or quaternary amines, nitrilotriacetic acid (NTA), ethylenediaminetetraacetic acid (EDTA), diethylenetriamine (DETA) phosphonate, and any combination thereof. In some embodiments, the scale inhibitors are acid-based scale inhibitors, such as phosphonic acid and diacids. In some embodiments, the scale inhibitor comprises at least one anionic group. The anionic group may comprise, for example, a carboxylate group or a sulfate group. In some embodiments, the scale inhibitor may include a phosphorous atom, one or more phosphorous-oxygen double bonds, and/or one or more phosphono groups.

Representative examples of specific scale inhibitors that may be used in accordance with the present disclosure include hexamethylene diamine tetrakis (methylene phosphonic acid), diethylene triamine tetra (methylene phosphonic acid), diethylene triamine penta (methylene phosphonic acid), polyacrylic acid (PAA), phosphino carboxylic acid (PPCA), diglycol amine phosphonate (DGA phosphonate), 1-hydroxyethylidene 1,1-diphosphonate (HEDP phosphonate), bisaminoethylether phosphonate (BAEE phosphonate), 2-acrylamido-2-methyl-1-propanesulphonic acid (AMPS), and any combination thereof.

In some embodiments, the scale inhibitor is a polymer comprising an anionic monomer. The anionic monomer may be selected from, for example, acrylic acid, methacrylic acid, vinyl sulfonic acid, vinyl phosphonic acid, maleic anhydride, itaconic acid, crotonic acid, maleic acid, fumaric acid, styrene sulfonic acid, and any combination thereof.

In some embodiments, the scale inhibitor is a polymer formed from a diallyl ammonium salt (e.g., dially dimethyl ammonium chloride) and at least one anionic monomer. Representative examples of such scale inhibitors are disclosed in WO 2007/015090 and WO 2007/080417, the contents of which are incorporated into the present application in their entirety.

Additional examples of useful scale inhibitors include GYPTRON® SA3050, GYPTRON® SA1820, GYPTRON® SA1400, GYPTRON® SA1470, GYPTRON® SA1110, GYPTRON® SA1460, and GYPTRON® SA1910, which are all available from ChampionX.

In some embodiments, a carrier fluid comprises, consists of, or consists essentially of a scale inhibitor. The carrier fluid that comprises, consists of, or consists essentially of the scale inhibitor may be interchangeably referred to as the second carrier fluid. In some embodiments, the scale inhibitor may be dissolved, dispersed and/or suspended in the second carrier fluid.

The second carrier fluid may be aqueous or non-aqueous. Suitable non-aqueous carriers include alkanols, such as methanol or polyols (e.g., a glycol). In some embodiments, glycols include those of the formula $(CH_2)_n(OH)_2$ wherein n is 2 to 6 (e.g., ethylene glycol). Other suitable non-aqueous carriers include, but are not limited to, aldehydes, diesel, base oil (mineral oil), kerosene, heavy aromatic naptha and petroleum distillates.

Alternatively, the second carrier fluid may be aqueous (e.g., sea water). The aqueous carrier fluid may comprise, for example, clean, filtered, produced brine, or brine prepared by adding inorganic salts, such as $KCl$ or $NH_4Cl$, to water.

The second carrier fluid and the scale inhibitor may be combined using batch mixing. For example, a volume of brine may be contained in a tank and the scale inhibitor, along with any additional additives, may be added to the tank and mixed into the brine. In some embodiments, the combination may be prepared by pumping brine from a source and injecting the scale inhibitor, along with any additional additives, into the flowing brine. The scale inhibitor and any additional additives may be mixed into the brine by means of a static mixer or other mechanical device before entering the wellbore.

The amount of the scale inhibitor in the second carrier fluid may be selected by one of ordinary skill in the art. In some embodiments, the second carrier fluid comprises from about 0.1 wt. % to about 70 wt. % of the scale inhibitor. For example, the second carrier fluid may comprise from about 0.1 wt. % to about 50 wt. % of the scale inhibitor, from about 0.1 wt. % to about 40 wt. % of the scale inhibitor, from about 0.1 wt. % to about 30 wt. % of the scale inhibitor, from about 0.1 wt. % to about 20 wt. % of the scale inhibitor, from about 0.1 wt. % to about 15 wt. % of the scale inhibitor or from about 0.1 wt. % to about 10 wt. % of the scale inhibitor. In certain embodiments, the second carrier fluid comprises greater than 20 wt. % to about 70 wt. % of the scale inhibitor, such as greater than about 25 wt. % to about 70 wt. % of the scale inhibitor or greater than about 30 wt. % to about 70 wt. % of the scale inhibitor.

In some embodiments provided herein, the silica-based nanoparticles are deposited on one or more surfaces of the subterranean reservoir in a first step and the scale inhibitor is transported to the one or more surfaces within the subterranean reservoir in a second step. In certain embodiments, a scale inhibitor is not added to the reservoir in the first step. In certain embodiments, no silica-based nanoparticles are added to the reservoir during the second step. In some embodiments, the silica-based nanoparticles and the scale inhibitor are added to the reservoir separately. In some embodiments, the first step consists or consists essentially of adding silica-based nanoparticles to the reservoir. In certain embodiments, the second step consists of or consists essentially of adding a scale inhibitor to the reservoir. In still further embodiments, silica-based nanoparticles may be added during the first step and with the scale inhibitor during the second step.

If a step consists essentially of adding a silica-based nanoparticle, the step excludes adding compositions, compounds, chemicals, etc., that would materially affect the basic and novel characteristic(s) of the process, such as an organosilane, a carbon-based nanomaterial, and/or a clay mineral. In certain embodiments, organosilanes, carbon-based nanomaterials, and/or clay minerals are not added to the subterranean reservoir while practicing the presently disclosed methods.

When the methods disclosed herein are carried out in connection with squeeze treatments, the first step may be, for example, carried out in connection with the preflush step. However, silica-based nanoparticles may also be added in connection with the main pill and/or overflush steps. As used herein, the term "preflush" describes a step in which a reservoir is prepared to undergo treatment with at least a scale inhibitor. The preflush step wets the surfaces within the reservoir and delivers the silica-based nanoparticles. In some embodiments, the preflush is carried out by injecting a carrier fluid comprising the silica-based nanoparticles into the subterranean reservoir.

The second step may be carried out in connection with the main pill and/or the overflush steps. As used herein, the term "main pill" describes a method step in which the subterranean reservoir is contacted with at least a scale inhibitor. The term "overflush" describes a method step in which a fluid is introduced into the subterranean reservoir to push, force or displace the scale inhibitor out of the wellbore and into the reservoir. This step is generally carried out because treatment chemicals, such as scale inhibitors, are usually delivered to the wellbore and although some of the compositions will flow into the reservoir, the process is slow, especially in reservoirs having low permeability. The overflush, however, creates pressure that forces the treatment chemical into the reservoir where it can interact with one or more surfaces within the reservoir and/or the silica-based nanoparticles. The fluid pumped/injected during the overflush and/or main pill steps may be any fluid or carrier fluid disclosed herein, such as a brine.

In some embodiments, after the scale inhibitor is delivered to one or more surfaces of the reservoir, the reservoir may be shut-in for some period of time, such as about 1 hour to about 48 hours, before production resumes.

Any carrier fluid disclosed herein, such as the carrier fluid comprising the silica-based nanoparticles or the carrier fluid comprising the scale inhibitor, may also contain one or more additives. Illustrative, non-limiting examples of additives are selected from the group consisting of surfactants, emulsion preventers, solvents, oxygen scavengers, hydrogen sulfide scavengers, corrosion inhibitors, biocides, stabilizing agents, pH buffering agents, acidulants, friction reducers, viscosity enhancers, defoaming agents, anti-redeposition agents, bleaching agents, solubility modifiers, dispersants, rinse aids, metal protecting agents, emulsion breakers, emulsion stabilizers, iron dissolvers, chelating agents, peracid stabilizers, acids, antimicrobial agents, fragrances, dyes, rheology modifiers, hydrotropes, buffers and any combination thereof.

The amount of additive(s) in the fluid is not particularly limited and may be selected by one of skill in the art. In some embodiments, the additive is present in an amount ranging from about 0.0001 wt. % to about 50 wt. %. For example, the additive may be present from about 0.001 wt. % to about 40 wt. %, about 0.001 wt. % to about 30 wt. %, from about 0.001 wt. % to about 20 wt. %, from about 0.01 wt. % to about 20 wt. % or from about 0.01 wt. % to about 10 wt. %.

EXAMPLES

Packed flood was used as a screening tool to carry out various experiments. In experiment A (baseline), a squeeze treatment was conducted and a brine including about 4%

KCl was added during the preflush stage. Silica-based nanoparticles were not added during the preflush stage. In experiment B, silica-based nanoparticles (about 10 wt. %) were added to the 4% KCl brine and the resulting fluid was added during the preflush stage. The main pill was the same for both experiment A and experiment B (about 10 wt. % DETA phosphonate in about 4% KCl brine).

As can be seen in FIG. 1, more than a two times increase in protected pore volume (and hence improvement in anticipated squeeze life extension) was observed when silica-based nanoparticles were added to the preflush.

Figure 2:
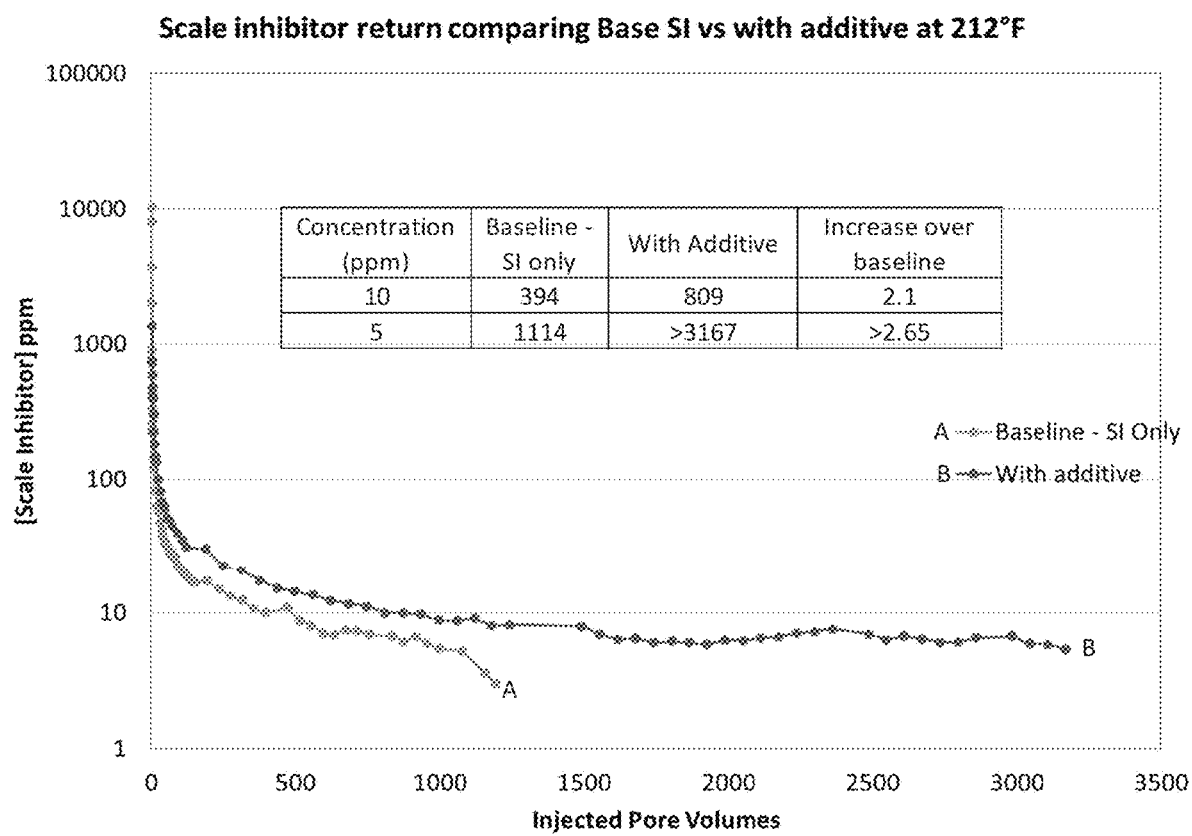

A similar experiment was carried out except about 0.1 wt. % silica-based nanoparticles were added to the 4% KCl brine instead of about 10 wt. % as used in the above experiment B. Results are shown in FIG. 2. As can be seen, a three times increase in protected pore volume (and hence improvement in anticipated squeeze life extension) was observed when silica-based nanoparticles were added to the preflush.

The scale inhibitor provided herein exhibits a sustained release into the subterranean reservoir when used in connection with the presently disclosed methods. The scale inhibitor treatments disclosed herein have a longer effective lifetime than similar treatments but without the addition of silica-based nanoparticles. In some embodiments, the methods disclosed herein can inhibit scale formation about 50%, about 100%, about 200%, or about 300% longer than a similar method but without the addition of silica-based nanoparticles. In certain embodiments, the methods disclosed herein provide a two to three times improvement in squeeze life compared to similar methods that do not add silica-based nanoparticles to the reservoir.

All of the compositions and methods disclosed and claimed herein can be made and executed without undue experimentation in light of the present disclosure. While this invention may be embodied in many different forms, there are described in detail herein specific embodiments. The present disclosure is an exemplification of the principles of the invention and is not intended to limit the invention to the particular embodiments explicitly described. In addition, unless expressly stated to the contrary, use of the term "a" is intended to include "at least one" or "one or more." For example, "a scale inhibitor" is intended to include "at least one scale inhibitor" or "one or more scale inhibitors."

Any ranges given either in absolute terms or in approximate terms are intended to encompass both, and any definitions used herein are intended to be clarifying and not limiting. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges (including all fractional and whole values) subsumed therein.

Any composition disclosed herein may comprise, consist of, or consist essentially of any element, component and/or compound disclosed herein or any combination of two or more of the elements, components or compounds disclosed herein.

Any method disclosed herein may comprise, consist of, or consist essentially of any method step disclosed herein or any combination of two or more of the method steps disclosed herein.

The transitional phrase "comprising," which is synonymous with "including," "containing," or "characterized by," is inclusive or open-ended and does not exclude additional, un-recited elements, components, compounds and/or method steps.

The transitional phrase "consisting of" excludes any element, component, compound, and/or method step not specified in the claim.

The transitional phrase "consisting essentially of" limits the scope of a claim to the specified elements, components, compounds and/or steps, as well as those that do not materially affect the basic and novel characteristic(s) of the claimed invention.

Unless specified otherwise, all molecular weights referred to herein are weight average molecular weights and all viscosities were measured at 25° C. with neat (not diluted) polymers.

As used herein, the term "about" refers to the cited value being within the errors arising from the standard deviation found in their respective testing measurements, and if those errors cannot be determined, then "about" may refer to, for example, within 5% of the cited value.

Furthermore, the invention encompasses any and all possible combinations of some or all of the various embodiments described herein. It should also be understood that various changes and modifications to the presently disclosed embodiments will be apparent to those skilled in the art. Such changes and modifications can be made without departing from the spirit and scope of the invention and without diminishing its intended advantages. It is therefore intended that such changes and modifications be covered by the appended claims.

What is claimed is:

1. A method of inhibiting scale formation in a subterranean reservoir, comprising:
    depositing silica-based nanoparticles on a surface of the subterranean reservoir,
    transporting a scale inhibitor to the surface of the subterranean reservoir,
    adhering the scale inhibitor to the silica-based nanoparticles through a chemical interaction,
    inhibiting scale formation in the subterranean reservoir, and
    excluding a step of adding an organosilane to the subterranean reservoir,
    wherein the silica-based nanoparticles and the scale inhibitor are added to the subterranean reservoir separately.

2. The method of claim 1, wherein the chemical interaction comprises forming a bond between the scale inhibitor and the silica-based nanoparticles.

3. The method of claim 2, wherein the bond is selected from the group consisting an ionic bond, a covalent bond, a metallic bond, a hydrogen bond, a dipole-dipole interaction, a van der Waals bond, and any combination thereof.

4. The method of claim 1, further comprising adhering the silica-based nanoparticles to the surface of the subterranean reservoir through a second chemical interaction.

5. The method of claim 4, wherein the second chemical interaction comprises forming a bond between the surface of the subterranean reservoir and the silica-based nanoparticles.

6. The method of claim 1, wherein the subterranean reservoir comprises a hydrocarbon.

7. The method of claim 1, wherein the silica-based nanoparticles comprise a particle size from about 0.1 nm to about 1,000 nm.

8. The method of claim 1, wherein the silica-based nanoparticles are deposited on the surface of the subterranean reservoir in a first step and the scale inhibitor is transported to the surface of the subterranean reservoir in a second step.

9. The method of claim 8, wherein the second step further comprises depositing additional silica-based nanoparticles on the surface of the subterranean reservoir.

10. The method of claim 1, wherein a carrier fluid comprises the silica-based nanoparticles.

11. The method of claim 10, wherein the carrier fluid comprises from about 0.1 wt. % to about 70 wt. % of the silica-based nanoparticles.

12. The method of claim 1, wherein a second carrier fluid comprises the scale inhibitor.

13. The method of claim 12, wherein the second carrier fluid comprises from about 0.1 wt. % to about 70 wt. % of the scale inhibitor.

14. The method of claim 1, wherein the scale inhibitor comprises a member selected from the group consisting of a phosphonate, a sulfonate, a phosphate ester, a polymeric scale inhibitor, and any combination thereof.

15. The method of claim 1, excluding a step of adding a carbon-based nanomaterial or a clay mineral to the subterranean reservoir.

16. The method of claim 1, wherein the silica-based nanoparticles are colloidal silica-based nanoparticles or functionalized silica-based nanoparticles.

17. A method of inhibiting scale formation in a subterranean reservoir, comprising:
preflushing the subterranean reservoir with an aqueous solution comprising silica-based nanoparticles,
delivering a scale inhibitor to a wellbore of the subterranean reservoir,
transporting the scale inhibitor to a surface within the subterranean reservoir,
adhering the scale inhibitor to the silica-based nanoparticles through a chemical interaction,
inhibiting scale formation in the subterranean reservoir, and
excluding a step of adding an organosilane to the subterranean reservoir,
wherein the silica-based nanoparticles and the scale inhibitor are added to the subterranean reservoir separately.

18. The method of claim 17, wherein additional silica-based nanoparticles are added to the subterranean reservoir during the delivering and/or transporting steps.

19. The method of claim 17, wherein the aqueous solution comprises greater than 10 wt. % to about 70 wt. % of the silica-based nanoparticles.

* * * * *